Nov. 24, 1959   R. L. MITCHELL   2,914,275
TYPEWRITER PAD
Filed June 4, 1957
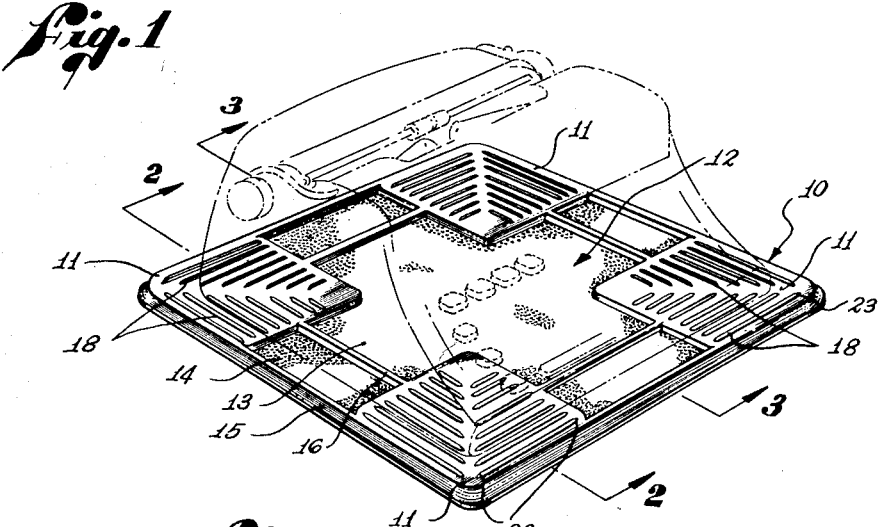
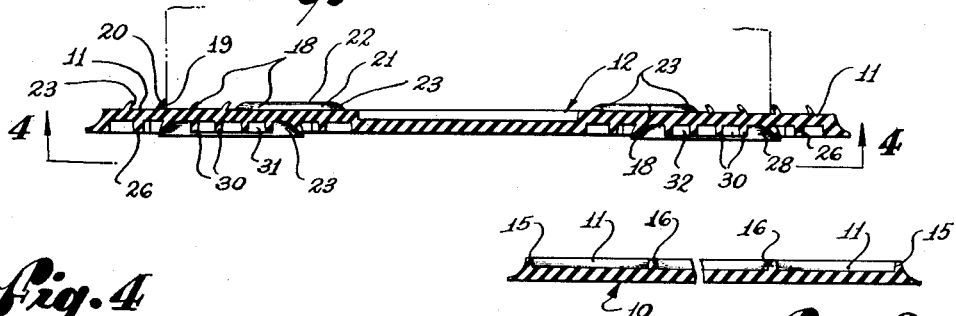
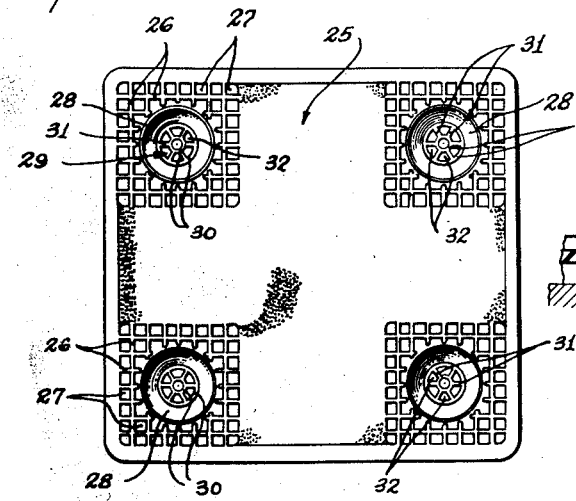
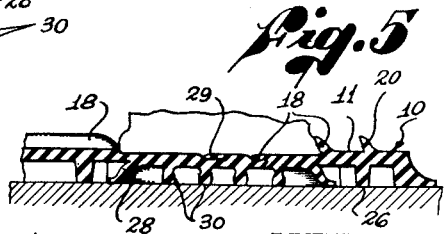
INVENTOR.
ROBERT L. MITCHELL

2,914,275
TYPEWRITER PAD
Robert L. Mitchell, Los Angeles, Calif.

Application June 4, 1957, Serial No. 663,501

4 Claims. (Cl. 248—22)

This invention relates generally to typewriter pads, and more particularly to an improved typewriter pad composed of rubber, or other material having substantially the same characteristics.

It is a common practice to place typewriters on a pad of some sort. These pads serve several purposes. For one thing, they help reduce the noise which a typewriter normally produces when placed on a hard, unprotected surface. Also, the pads generally have some degree of shock-absorbing capacity, and thus ease the strain on the operator and the typewriter by reducing jars and vibrations. Another desirable feature sometimes provided by such a pad is that the pad engages both the supporting surface and the undercarriage of the typewriter in such a manner that the typewriter is prevented from sliding or "walking" about.

Typewriter pads incorporating the above-mentioned features in varying degrees have been in use for many years, but prior to this invention, none has proven truly satisfactory. One type of pad used is made of felt material, but these pads do not grip their supporting surface or the undercarriage of the typewriter resting on them, and therefore do not prevent the typewriter from sliding or "walking" about. In fact, pads made of felt material have been found to slide quite easily on any smooth supporting surface, and thus increase the possibility of the typewriter sliding about and perhaps falling off of its support.

Pads have also been made from sponge rubber, but this too has proven unsatisfactory. Though sponge rubber makes a better pad from the aspect of preventing the typewriter from sliding or "walking," it has been found that the weight of a typewriter completely collapses the sponge rubber core of such a pad and results in the pad losing practically all of its resilient properties. Because of this loss of resilience, the sponge rubber pad then fails to effectively reduce the noise or absorb the vibrations which the typewriter produces. Also, sponge rubber does not wear well and tears easily.

Rubber has been found to be an exceptionally satisfactory typewriter pad material from the aspects of durability, economy, and cleanliness, but it too has certain disadvantages which must be overcome before a truly satisfactory pad can result. One disadvantage is that a solid pad of rubber is a little too rigid to adequately absorb the noise and vibration of a typewriter; another, is that such a pad is so springy that it has a tendency to jump the typewriter off of the supporting surface.

It is therefore a major object of my invention to provide a typewriter pad of rubber, or like material, which makes available the usual advantages such as cleanliness, economy and durability, inherent in such material, and at the same time overcomes the above-mentioned disadvantages usually encountered.

It is also an object of this invention to provide a typewriter pad of the character described above which has engaging means that are capable of accommodating different sized typewriters without adjustment and positively engage the typewriter undercarriage to prevent the typewriter from "walking" or sliding on the pad.

A further object of my invention is to provide a typewriter pad of the type described above which has releasable means for positively engaging a supporting surface to prevent the pad from sliding on this surface.

Still another object of my invention is to provide a typewriter pad of the character described above which incorporates shock-absorbing structure that renders it especially effective in absorbing the noise and vibrations normally produced by a typewriter.

Still a further object of my invention is to provide a typewriter pad of the type described above in which all portions of the pad except those actually supporting the typewriter are considerably reduced in thickness, thereby lessening the weight and expense of the pad, and in which open compartments are provided in certain of these reduced portions for the storage of paper clips, erasers and other similar items.

These and other advantages of my invention will become apparent from the following detailed description of a preferred embodiment thereof, read in connection with the accompanying drawings in which:

Figure 1 is a perspective view of the upper surface of a preferred embodiment of my pad;

Figure 2 is a cross-sectional view taken on line 2—2 of Figure 1;

Figure 3 is a cross-sectional view taken on line 3—3 of Figure 1;

Figure 4 is a plan view of the undersurface of my pad; and

Figure 5 is an enlarged cross-sectional view similar to Figure 2, showing a portion of the pad in a compressed condition.

Referring now to the drawings, and particularly to Figure 1 thereof, the reference numeral 10 indicates generally a preferred embodiment of my typewriter pad. The pad 10 is composed of rubber or other suitable material having a similarly firm, smooth surface and substantially the same resilience and gripping ability; as, for instance, certain synthetic rubbers and platic materials.

The pad 10 is rectangular in shape and has an area slightly greater than the area covered by the undercarriage of the largest typewriter in the class for which the pad is designed. To support the feet, frame or other undercarriage of the typewriter, raised cushions 11 of extra thickness are provided at each corner on the upper surface 12 of the pad. The remainder of the pad 10, including the center portion 13, is of greatly reduced thickness as compared to the cushions 11. Open-topped compartments 14 are provided in this reduced thickness parts by provision of a raised border 15 which extends around the periphery of the upper surface 12 and partitions 16 which run parallel to the border 15 and connect the midpoints of adjacent sides of cushions 11. These compartments 14 are convenient for storing paper clips, erasers, and like items.

To prevent a typewriter mounted on pad 10 from "walking" or sliding about, engaging means are provided on the upper surface 12. The engaging means consist of a plurality of cleats 18 which are disposed in groups, one group on each of the cushions 11. The cleats 18 are formed in the surface of cushions 11 and protrude therefrom to engage the undercarriage of the typewriter. The cleats 18 are formed in pairs with the cleats of each pair being positioned at right angles with respect to each other and parallel to the sides of the pad. The individual pairs of cleats 18 are parallel to each other and are evenly and closely spaced inwardly from the corners of the pad. Since the cushions 11 are square, the cleats comprising the innermost pairs are shorter than those comprising the outermost pairs and, in effect, are nested therein.

Each of the cleats is tapered upwardly and has a face wall 19 which slants inwardly with respect to the sides of the pad, forming an acute angle with the surface of the cushion 11, and a back wall 20 which also slants inwardly with respect to the sides of the pad and forms a greater acute angle with the surface of cushion 11 than face wall 19. The cleats 18 of each pair are spaced slightly from each other at their closest point so that they do not form a single unit and the back wall 20 of each cleat curves inwardly at its ends 21. The uppermost edge 22 of each cleat 18 runs parallel to upper surface 12 for the greater portion of its length and then curves downwardly into upper surface 12 at its ends, thereby cooperating with the curved ends 21 of back wall 20 to form flanges 23. The flanges 23 connect the ends of each of the cleats 18 to the upper surface 12 in such a manner that the cleats offer considerable resistance to movement when engaged at the face wall 19, but are easily collapsed when engaged on the back wall 20.

Cleats 18 therefore function like a ratchet. If, for instance, they are engaged by the undercarriage of a typewriter, when the typewriter is moving either in a vertically downward direction or horizontally inward from the sides of the pad, the cleats when engaged will collapse and offer no substantial resistance to such movement (see Figure 5). If, however, the cleats are engaged by the undercarriage when the typewriter is moving horizontally outward with respect to the pad, they will offer substantial resistance to its movement.

It will also be understood that because of the slanting position of the cleats 18 and the pattern of their disposition, the undercarriage of a typewriter, when placed on the cushions 11, adjusts itself to the various pairs by collapsing those which it strikes from a vertical or inwardly moving horizontal direction, but always leaving erect pairs of cleats adjacent its periphery. The collapsed cleats 18 are adapted to provide a firm foundation for the typewriter when in that position, and if the typewriter attempts to slide or walk about, the erect pairs of cleats adjacent its periphery engage the undercarriage and resist movement. Thus, the typewriter is held securely on the pad 10.

To insure that pad 10 has the proper shock-absorbing and sound-absorbing capabilities for effectively absorbing the noise and vibration normally produced by a typewriter, unique structural features are incorporated into the undersurface 25 of the pad. The undersurface of each of the cushions 11 has ribs 26 formed perpendicularly thereto which intersect to form pockets 27. The thickness of the ribs 26 is related to the resilience of the material used so that the ribs have sufficient strength to be flexed only slightly from their normal vertical planes when a typewriter is disposed on the pad. This gives the ribs 26 adequate shock-absorbing ability to absorb the vibration and jars of the typewriter and yet, at the same time, assures stable support.

The pockets 27, formed by the intersection of the ribs 26, substantially increase the sound-absorbing capabilities of the pad and, in addition, tend to grip a supporting surface like small suction cups and resist any sliding movement of the pad.

The ribs 26 in this embodiment are straight and intersect at right angles but, as will be readily apparent, they could also be made of other configurations and still function as described.

To provide additional, more effective means for resisting sliding movement of pad 10 on a support surface, suction cups 28 are formed in undersurface 25, one under each cushion 11. The suction cups 28 are positioned in the center of the intersecting rib structure described above and have a slightly greater depth than the ribs 26 so that their lower edges protrude slightly below the undersurface 25. The suction cups 28 are also much more flexible than ribs 26 and have circular center supports 29, disposed in their centers.

The center supports 29 are composed of intersecting ribs similar to ribs 26 but, in order to form a circular periphery for the support, the ribs consist of two concentric rings 30 and radially extending spokes 31, which are disposed between the rings 30 and divide the center supports into pockets 32. The pockets 32 in the center supports are effective for absorbing sound and resisting sliding movement of the pad on a supporting surface in the same manner as the pockets 27 formed by the ribs 26.

When a typewriter is rested on pad 10, the center support rings 30 and spokes 31 flex slightly from their vertical planes in the same manner as ribs 26. This permits the cushions 11 to compress vertically an amount sufficient for suction cups 28 to be forcibly expanded by the supporting surface and thus establish a suction connection to the surface in the usual suction cup manner (see Figure 5).

The ribs 26 and center supports 29 give the cushions 11 sufficient strength to prevent suction cups 28 from being squashed by the typewriter; instead, they allow the pad to be slightly compressed so that it still provides a firm stable supporting platform.

From the above description, it will be appreciated that a typewriter pad incorporating my invention provides substantial advantages over previously known pads. My invention now makes it practical to use typewriter pads of rubber, or material of similar characteristics, and thus enjoy the inherent benefits of these materials because it overcomes the disadvantages which formerly hampered the use of such pads.

The cleats 18 provided on upper surface 12 engage the undercarriage of a typewriter disposed on the pad and prevent it from sliding or "walking" about. Cleats 18 are so arranged that they accommodate different sized typewriters, and, when collapsed by the typewriter undercarriage, provide a stable foundation.

The pad is prevented from sliding on even the smoothest of supporting surfaces by the suction connection established through operation of suction cups 28 aided by the gripping effect of pockets 27 and 32.

In addition, the intersecting ribs 26, center support rings 30 and spokes 31 give a shock-absorbing capability to the pad which is exceptionally effective for absorbing vibrations and jars, and, in conjunction with the pockets 27 and 32, also provide an excellent means of reducing noise.

Furthermore in my invention, because of the reduced thickness portions these advantages are made available in a light, inexpensive pad without sacrificing the ability of the pad to provide a firm, stable platform for the typewriter.

While the embodiment herein shown and described is fully capable of achieving the objects and providing the advantages herein stated, it should be understood that I do not mean to limit myself to the specific details disclosed, except as defined in the appended claims.

I claim:

1. A typewriter pad comprising: a layer of resilient deformable material; gripping means on the undersurface of said layer for engaging a supporting surface and resisting sliding movement of said layer on said surface; and engaging means on the upper surface of said layer for positively engaging a typewriter disposed thereon to prevent said typewriter from walking and sliding on said layer, said engaging means including a plurality of cleats disposed on said upper surface in closely spaced series, said cleats being formed as upwardly and inwardly inclined teeth projecting above said upper layer surface and adapted to be compressed downwardly by the vertical pressure of a typewriter foot and resisting outward movement of the edge of said foot.

2. A typewriter pad comprising: a layer of resilient deformable material; a plurality of ribs disposed perpendicular to and formed integral with the undersurface of said layer and intersecting to form pockets therein, said ribs being of such thickness as to flex from their normal positions, when subjected to the weight of a typewriter disposed on said layer, to such a degree as to improve the ability of said layer to absorb the shocks and vibration normally produced by said typewriter and yet provide a stable support for said typewriter, and said pockets being effective to absorb noise and establish gripping contact with a supporting surface; suction cups on the undersurface of said pad operatively associated with said ribs, said cups being sufficiently flexible and of the proper depth to expand and form positive suction engagement with said supporting surface when said ribs are flexed as aforesaid; and a plurality of cleats inclined upwardly and inwardly from the upper surface of said layer and positioned to positively engage said typewriter disposed on said layer and resist sliding and walking movement of said typewriter thereon, said cleats being arranged in a closely spaced series to accommodate different sized typewriters and being collapsible, when engaged by said typewriter from a vertical direction, and resisting outward movement thereof.

3. A typewriter pad comprising: a layer for resilient deformable material; and a plurality of upwardly and inwardly inclined cleats formed on the upper surface of said layer and disposed in a closely spaced series such that a typewriter disposed on said pad will vertically engage some of said cleats but will avoid others which are outwardly adjacent said engaged cleats, said cleats being resiliently collapsible when engaged from a vertical direction but offering substantial resistance to deformation when engaged in an outwardly horizontal direction whereby said vertically engaged cleats will be collapsed downwardly by said typewriter, and said outwardly adjacent cleats will resist outward sliding movement of said typewriter on said pad.

4. A typewriter pad comprising: a rectangular layer of resilient deformable material; means on the undersurface of said layer for gripping the supporting surface to prevent sliding of said layer on said surface; and a plurality of cleats formed in pairs in the upper surface of said layer and positioned at the corner thereof with the cleats of each pair disposed at right angles with respect to each other and each parallel to a different one of the sides of said upper surface, said cleats extending taperedly upward with respect to said upper surface and slanting inwardly with respect to said upper surface sides at an acute angle to said upper surface, the outwardly directed faces of said cleats being curved inwardly at the ends thereof and the uppermost edges of said cleats being rounded downwardly into said upper surface at the ends thereof, with the cleats in each of said pairs slightly spaced apart at their closest point, said upper edge and outwardly directed faces thereby forming flanges at the ends of said cleats for connecting said cleats to said upper surface and substantially increasing the resistance of said cleats to outwardly directed generally horizontal movement of said typewriter, but not to vertical movement of said typewriter tending to collapse said cleats.

References Cited in the file of this patent

UNITED STATES PATENTS

| | | |
|---|---|---|
| 1,945,765 | Alpern | Feb. 6, 1934 |
| 2,609,991 | Jones | Sept. 9, 1952 |
| 2,821,391 | Buccicone | Jan. 28, 1958 |